United States Patent
Smith et al.

[19]

[11] Patent Number: 5,896,962
[45] Date of Patent: Apr. 27, 1999

[54] SOFT STOWAGE SYSTEM

[75] Inventors: David A. Smith, Huntsville; Bruce T. LaVerde, Decatur; Duane E. Lee, Huntsville; Alex H. Pest, Madison; Roger M. Spickard, Florence; J. Malcolm Tagg, Huntsville, all of Ala.

[73] Assignee: McDonnell Douglas Aerospace, Huntsville, Ala.

[21] Appl. No.: 08/938,541

[22] Filed: Sep. 26, 1997

Related U.S. Application Data

[63] Continuation of application No. 08/424,787, Apr. 19, 1995, abandoned.

[51] Int. Cl.$^6$ .............................. A45C 7/00; A45C 13/10; A45C 13/30
[52] U.S. Cl. ...................... 190/107; 190/110; 190/119; 190/903
[58] Field of Search .................................. 190/107, 108, 190/110, 116, 125, 112, 102, 119; 383/2, 11, 32, 38, 4, 106, 61; 224/581, 582, 583, 586, 257, 901.2, 901.4, 901.6, 901.8; 150/113

[56] References Cited

U.S. PATENT DOCUMENTS

| | | |
|---|---|---|
| 3,061,057 | 10/1962 | Miller . |
| 3,838,758 | 10/1974 | Brown ...................................... 383/2 X |
| 3,861,504 | 1/1975 | McGraw . |
| 4,170,282 | 10/1979 | Schwartzstein ...................... 190/108 X |
| 4,210,186 | 7/1980 | Belenson .............................. 190/110 X |
| 4,418,806 | 12/1983 | Johnson . |
| 4,424,841 | 1/1984 | Smith .................................. 224/582 X |
| 4,431,041 | 2/1984 | Leiserson ............................ 190/110 X |
| 4,451,111 | 5/1984 | Munroe . |
| 4,506,769 | 3/1985 | Franco et al. . |
| 4,637,535 | 1/1987 | Aleman ................................ 224/257 X |
| 4,679,242 | 7/1987 | Brockhaus ........................... 383/110 X |
| 4,824,050 | 4/1989 | Courter . |
| 4,874,119 | 10/1989 | Winter ...................................... 190/111 |
| 4,887,751 | 12/1989 | Lehman ............................... 190/110 X |
| 5,031,766 | 7/1991 | Cohen ................................. 190/108 X |
| 5,096,107 | 3/1992 | VanSon . |
| 5,295,565 | 3/1994 | Latshaw . |
| 5,297,870 | 3/1994 | Weldon ................................. 383/97 X |
| 5,413,199 | 5/1995 | Clement ................................. 190/108 |
| 5,472,279 | 12/1995 | Lin .............................................. 383/2 |

FOREIGN PATENT DOCUMENTS

| | | | |
|---|---|---|---|
| 2354727 | 1/1978 | France ................................... 190/107 |
| 0140570 | 4/1920 | United Kingdom ................... 190/107 |

*Primary Examiner*—Allan N. Shoap
*Assistant Examiner*—Niki M. Eloshway
*Attorney, Agent, or Firm*—Donald E. Stout

[57] ABSTRACT

A stowage system particularly for space applications comprises a flight bag (10), a backpack (66), a backpack adapter plate (96), and a pressurized stowage rack (104). The flight bag (10) is fabricated of a Kevlar/Nomex fabric, and its lid (18) includes an integral transparent panel (22) so that the contents of the bag may be readily identifiable without opening the bag. Beneath the lid (18) is a payload restraint net (24) which is removably attached to the interior liner of the bag to restrain small stowage items. The mesh comprising the net preferably includes one or more access slits (28) for accessing the interior of the case without removing the net and thereby risking loss of contents from the bag. The flight bag (10) also includes a plurality of hook and loop (VELCRO®) patches (30) about its periphery so that it may be collapsed upon itself for storage when not in use, and may additionally be rafted or trained to other flight bags if desired. The backpack (66) of the inventive stowage system comprises various configurations and can accommodate up to four flight bags or some combination of unique payload and/or foam. Web straps (72, 74, 76, 80, 82, 86), integral to the bag's structure, attach the bag and its contents to the backpack adapter plate (96) via quick release buckles (98, 100). A clear longitudinal panel (102) on the lid (68) allows quick identification of backpack and flight bag contents.

14 Claims, 5 Drawing Sheets

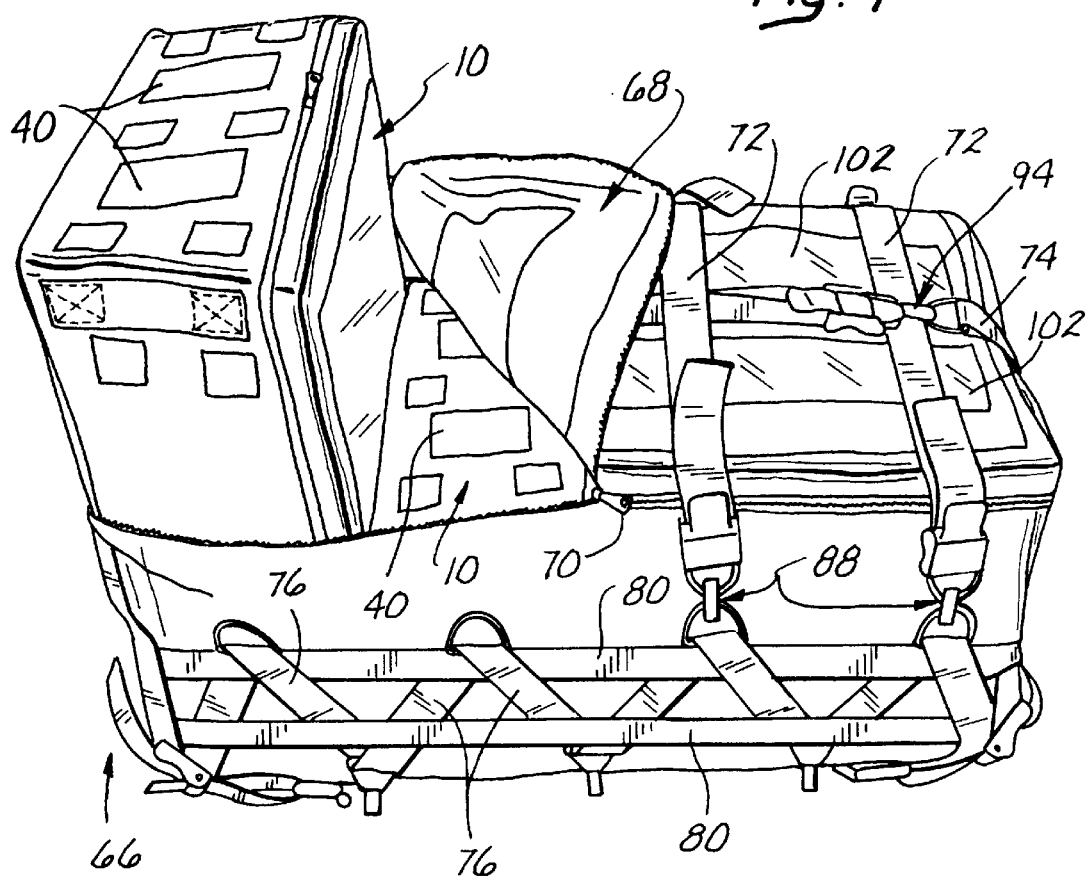

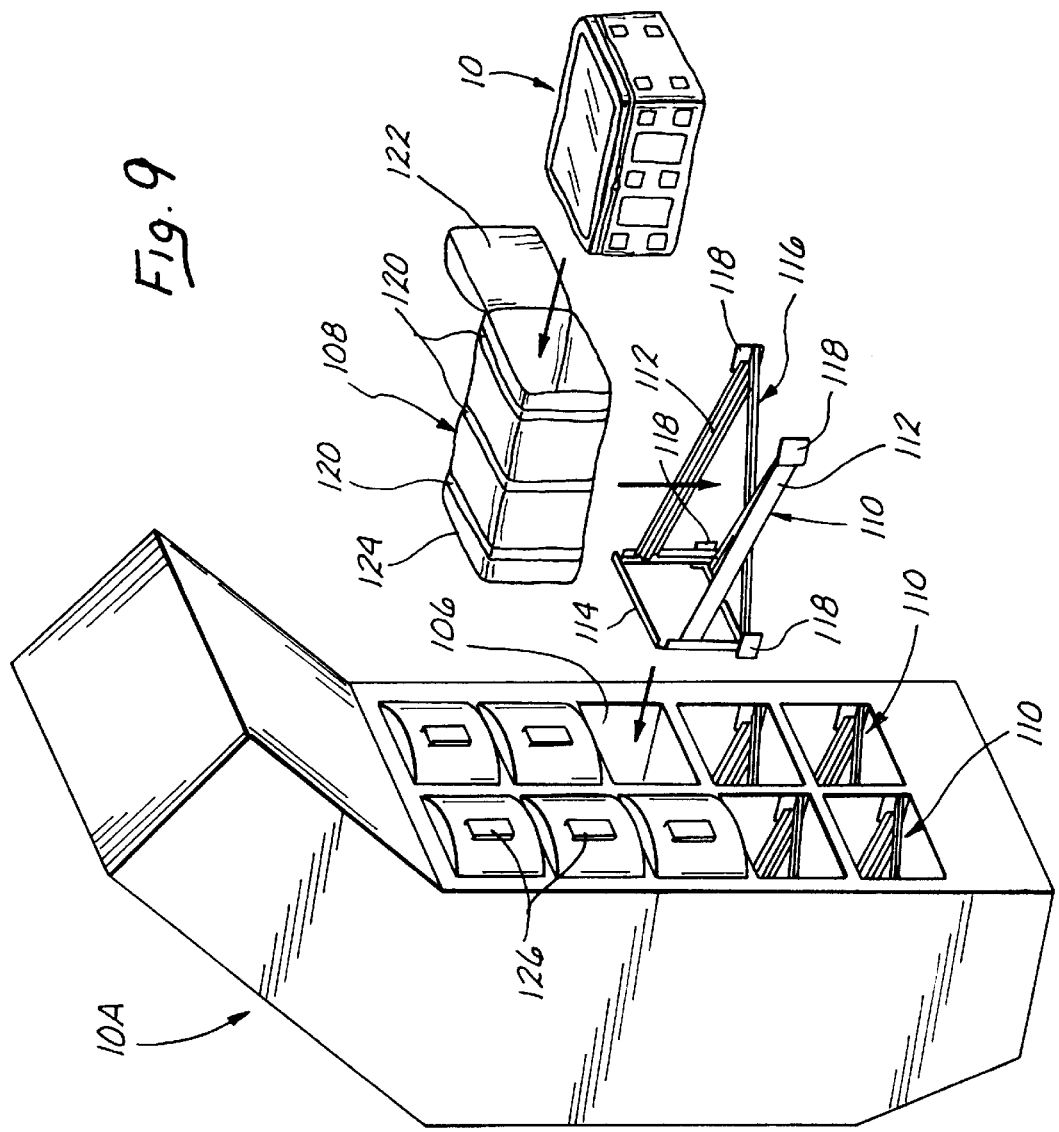

SOFT STOWAGE SYSTEM

This is a continuation, of application Ser. No. 08/424,787, filed Apr. 19, 1995, now abandoned.

BACKGROUND OF THE INVENTION

This invention relates generally to systems for storing items for travel, including clothing, bulk non-perishable food, and hard durable items, and more particularly to soft stowage systems for compactly and flexibly securing and retaining items in a space flight environment.

State of the art stowage systems for space vehicles typically include multiple metal stowage containers and on-board lockers or racks for receiving either the containers or individual items to be stowed. However, these current approaches to manned space logistics management are too costly in terms of analysis, configuration control, late versus early access, crew time required, and wear on equipment. Furthermore, the available upmass (launch weight capacity) is a constant, as is the pressurized volume available for stowage, for each existing and planned mated space vehicle, and any stowage system developed must operate within those fixed parameters. Also, upcoming manned spaceflights on space orbiters (like the U.S. space shuttle) or space stations are planned to be of longer duration and will thus require additional passive stowage capability for crew clothing, consumables, and items required to support science research.

Accordingly, what is needed is an improved stowage system which is lightweight, containerized, durable, convenient to transfer on-orbit, permits late access to load or remove items at the last minute, permits ready identification of the location of particular contents, and offers increased capacity over currently available systems.

SUMMARY OF THE INVENTION

The inventive soft stowage system solves the aforementioned problems pertaining to prior art stowage systems by providing a system which maximizes payload accommodation volume and uses a minimum of available upmass. It supports easy installation and removal of logistics resupply or payload items, supports early and late access requirements, and minimizes demand on crew time. The system is also reconfigurable, so that different items may be brought on return than were stowed on departure. Analysis has demonstrated that the inventive system offers up to tree times better mass efficiency and up to two times better volume efficiency compared to the most efficient existing systems, primarily by reducing payload secondary support structure.

More specifically, the inventive stowage system comprises four primary elements: the flight bag, the backpack, the backpack adapter, and the pressurized stowage rack. The flight bag is the smallest unit of stowage accommodation within the system and comprises a case fabricated of a Kevlar/Nomex fabric. Access to this bag is through the top via a zipper, which, when opened permits the lid to hinge away, as with a conventional suitcase. The lid includes a transparent panel integral therewith so that the contents of the bag may be readily identifiable without opening the lid. Beneath the lid is a payload restraint net which is removably attached to the interior liner of the bag to restrain small stowage items, particularly in a weightless environment. The mesh comprising the net preferably includes one or more access slits for accessing the interior of the case without removing the net and thereby risking loss of contents from the bag. The flight bag also includes a plurality of hook and loop (VELCRO) patches about its periphery so that it may be collapsed upon itself for storage when not in use, and may additionally be rafted or trained to other flight bags if desired. Up to eight flight bags may be joined together in both side-by-side and end-to-end configurations. Reusable, generic foam pillows are provided for accommodating various "hard" type payloads. A universal strap is available for attaching flight or backpack bags in multiple temporary configurations to hand rails, VELCRO patches and the like.

The backpack of the inventive stowage system comprises various configurations and can accommodate up to four flight bags or some combination of unique payload and/or foam. Access to this bag, like to the flight bag, is through the lid via a zipper that when fully opened allows the side to hinge away. Web straps, integral to the bag's structure, attach the bag and its contents to the backpack adapter via quick release buckles. The bag can be attached to the spacecraft in the X, Y, and Z axes. A clear longitudinal panel on the lid allows quick identification of backpack and flight bag contents.

The backpack adapter comprises a plate which interfaces the backpack to the spacecraft structure, typically the floor. Its use permits the backpack to be directly secured to the spacecraft in less than an hour, without the need for specialized ground support equipment.

As an alternative to the backpack, or stowing the flight bags in conventional lockers on board a spacecraft, a pressurized stowage rack may be used. The inventive rack is a high payload mass fraction rack applicable to Spacelab, SPACEHAB, and space station rack systems, for example, which optimizes delivery of passive cargo to high inclination (Mir and ISSA) orbits. It is up to three tines as efficient in transporting passive cargo than existing systems. The rack functions using a fabric bay liner which supports the flight bag and includes an integral fabric closeout. The bay liner then attaches to the rack via an aluminum X-strut. Advantageously, fabric closeouts having positive locking devices are used in place of metal doors. The system is modular, such that each bay is installed as a unit and unique liner sizing for unusually sized items is possible.

The invention, together with additional features and advantages thereof, may best be understood by reference to the following description taken in conjunction with the accompanying illustrative drawing.

BRIEF DESCRIPTION OF THE DRAWINGS

FIG. 7 is a perspective view illustrating a backpack constructed in accordance with the principles of the invention for receiving a plurality of flight bags;

FIG. 8 is a perspective view illustrating a somewhat modified backpack attached in a stowed position to a subfloor of a vehicle; and FIG. 9 is a perspective schematic view illustrating an embodiment of a storage rack for receiving and storing a plurality of flight bags.

DETAILED DESCRIPTION OF THE DRAWINGS

Figure 1:
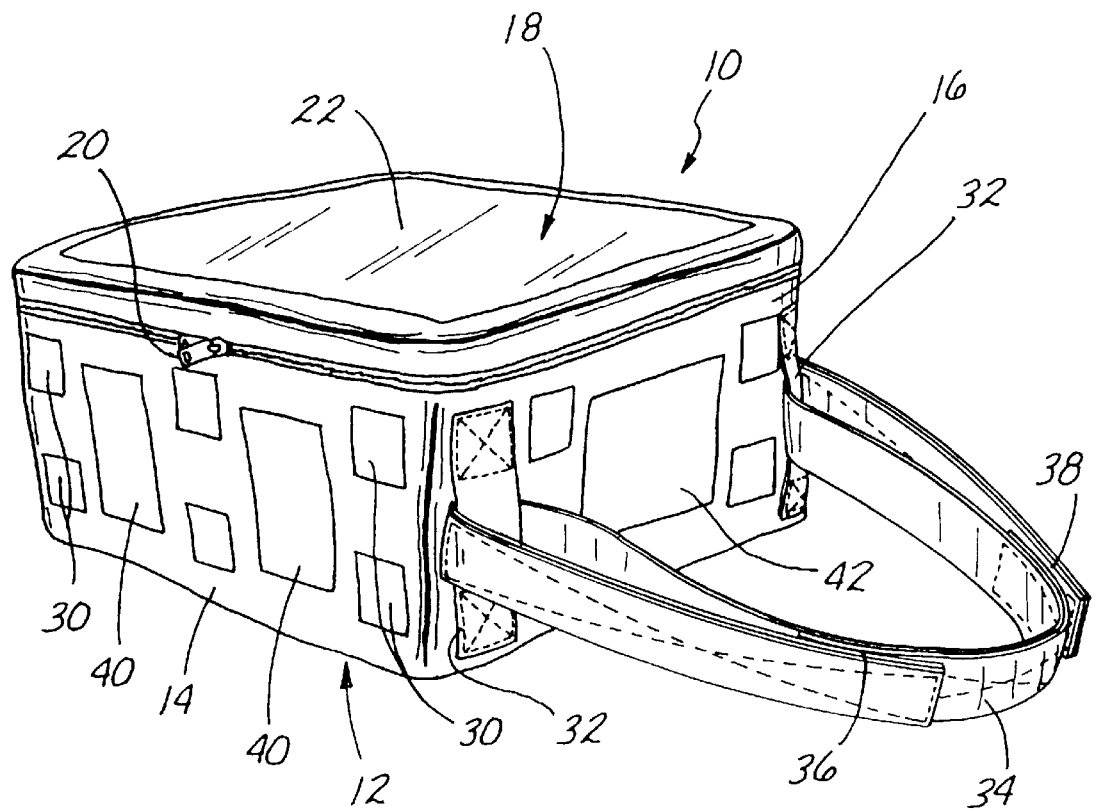
FIG. 1 is a perspective view of a soft flight bag constructed in accordance with the principles of the invention, illustrated in its expanded position.
Figure 2:
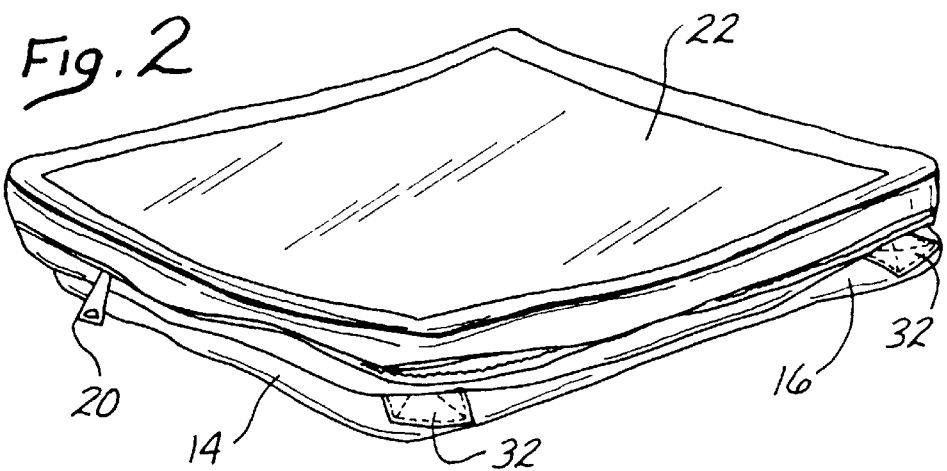
FIG. 2 is perspective view of the flight bag shown in FIG. 1, illustrating the bag in its collapsed position.
Figure 3:
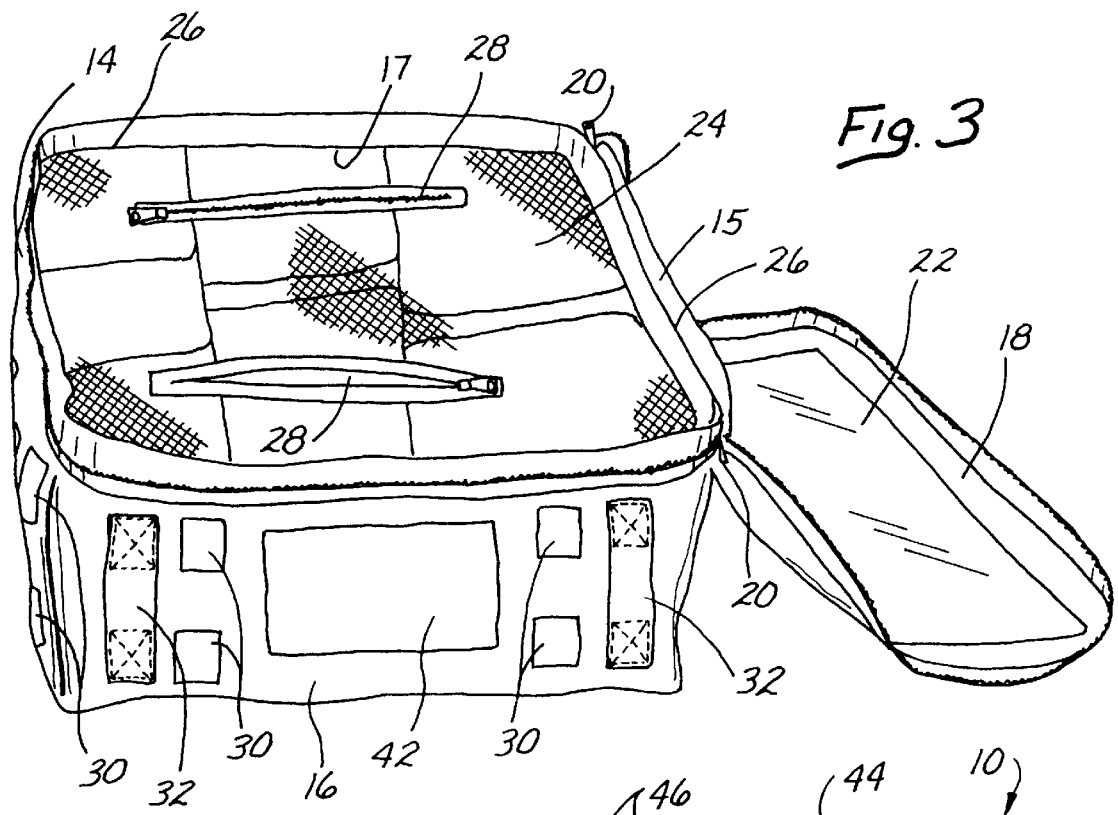
FIG. 3 is a perspective view from the side of the flight bag shown in FIG. 1, illustrated with the lid in its unzipped and opened position.

Referring now to FIGS. 1–3, there is shown an inventive soft flight bag 10 having a case 12 comprising two opposed side panels 14, 15, two opposed end panels 16, 17, and a lid 18. A conventional double zipper 20 preferably functions to secure the lid 18 in a closed position for storage or travel, and to permit ready access to the interior contents of the bag when desired. The bag, including the side panels 14, end panels 16, lid 18 and the bottom panel (not shown) is preferably fabricated of a Kevlar/Nomex fabric or similar fire resistant, tear/puncture resistant, high strength, lightweight material, and has dimensions of 10"×17"×21", though of course the bag could be constructed to any desired dimensions and configuration. When empty, the illustrated flight bag weights approximately 2 pounds, but can carry up to about 65 pounds of payload.

An advantageous feature of the invention is the provision in the lid 18 of an integral transparent panel 22 so that the contents of the bag may be quickly and easily identified without opening the lid. This transparent panel 22 is preferably fabricated of a transparent PTFE (TEFLON®) material, though of course other materials having transparent characteristics could be used.

Another unique feature of the invention, particularly adapted to space flights wherein the bag is in a weightless environment, is a see-through payload restraint ret 24 (FIG. 3), which may be disposed inside the bag beneath the lid 18. The net 24 is adapted to restrain small stowage items while in a weightless environment, may be fabricated of any desired mesh material, and is preferably installed in the bag by means of hook and loop (i.e. VELCRO®) closure strips 26 deployed about the perimeter of the net 24 and top portion of the case 12. Other fastening means could be employed instead, including, for example, snaps, buttons, or hook and loop tabs. The netting preferably includes one or more access slits 28 (two in the illustrated embodiment) for permitting access to the interior of the bag without lifting the netting 24. Optionally, the slits may include a closure means, as shown in FIG. 3, which may comprise any known fastening device, such as a zipper (as illustrated), hook and loop (VELCRO) strips, buttons, snaps, etc. A small netted pouch on the underside of the net 24 may be provided to hold an optional deodorant canister that could be used for crew clothing stowage over a long duration. The flight bag could be utilized with or without the net 24, merely by fastening it to or unfastening it from the case using the fastener 26.

Yet another advantageous feature of the invention is the provision of a plurality of hook and loop (VELCRO) patches 30 about the perimeter of the bag, preferably on each of the side and end panels 14, 15, 16, and 17. These patches 30 comprise two inch squares in the preferred embodiment, but any sized patches could be employed if desired. As illustrated, there are three columns of two patches each on the side panels 14, 15 and two columns of two patches each on the end panels 16, 17. By alternative combinations are possible, but an important feature is that each column on each side or end panel has one patch having hooks and one patch having loops (pile), so that the bag when not being used may be collapsed upon itself as illustrated in FIG. 2, wherein the two VELCRO patches 30 in each column have been collapsed down onto each other to secure the bag in the collapsed configuration. This collapsed configuration facilitates both stowage of unused bags by minimizing space requirements, particularly in a weightless environment, and stowage of multiple empty bags for transport to or from orbit.

Figure 6:
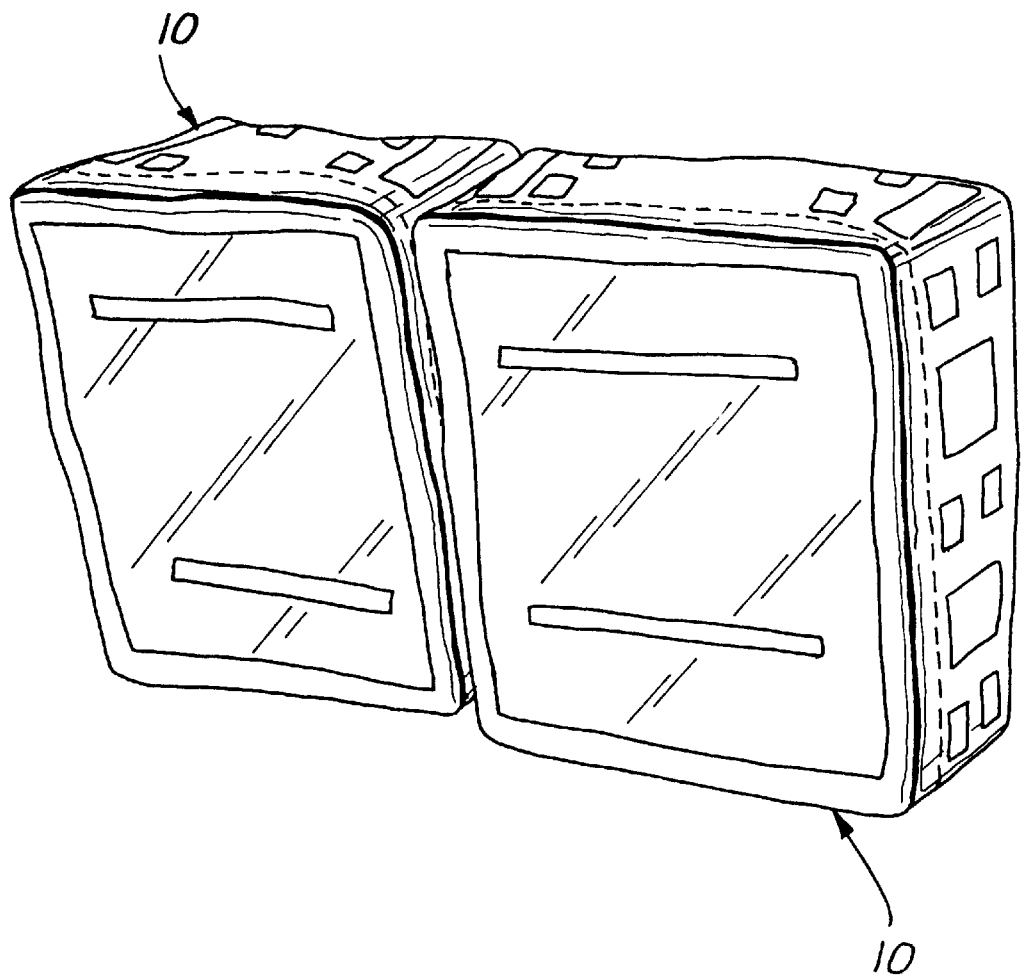
FIG. 6 is a perspective view showing two flight bags "rafted" together for compact and convenient storage and/or transport.

Furthermore, the patch orientations on opposing side and end panels of the bag are preferably reversed, so that a plurality of bags may be more easily trained or rafted together, in a number of different configurations, for convenient transport or storage, as illustrated in FIG. 6. In other words, if the upper patches in each column on the front side 14 of the bag 10 comprise pile, and the corresponding lower patches comprise hooks, then on the back side 15 of the bag, the upper patches in each column would comprise hooks, and the lower patches pile. Any number of bags may be rafted together, as desired, by rotating the bags as necessary to ensure interengagement of the hook and pile patches on each bag, and it may also be desired to include VELCRO patches on the lid and bottom of the bag to increase the possibilities for attaching the bags to one another. Advantageously, the requirement to align the VELCRO patches 30 before they will interlock ensures that the bags are always properly oriented when rafted together. Additionally, when not in use, the VELCRO patches provide convenient temporary hold-downs for miscellaneous pieces of equipment (pens, clip boards, etc.) or allow the bag to be attached to other structure within the cabin. This can be a very useful feature in a weightless environment.

A still further important feature of the inventive flight bag 10 is the employment on each corner of the bag of a belt loop 32, which is sewn into the structure of the bag as illustrated. These loops 32 provide anchor points for a universal strap 34 (FIG. 1), which may be configured to run between either adjacent or diagonal bag corner loops 32, as desired. In the illustrated embodiment, the strap 34 includes hook and loop (VELCRO) patches which are adapted to oppose one another when the strap has been installed on the bag, so that they may interengage at attachment points 36 and 38 (FIG. 1) to secure the strap in the installed position. Similarly, additional VELCRO patches may be employed on the strap so that it may be engaged with available crew cabin VELCRO or wrapped around crew handrails to secure the bag within the cabin. Of course, alternative strap configurations may be used as well, perhaps using snap ring interfaces and/or different securing means, as long as the end result is a versatile strap which may be readily installed for use in a variety of ways and which is adapted to attach the bag to various parts of the cabin when desired. When not in use, the strap may be conveniently stored just inside the flight bag lid.

Various additional features may be included on the bag 10 as well, including pocket content identifiers 40, which are adapted to receive content cards listing the bag contents. These cards may be easily changed out when the contents change. Sewn-on labels 42 may be employed as well, if desired.

Figure 4:
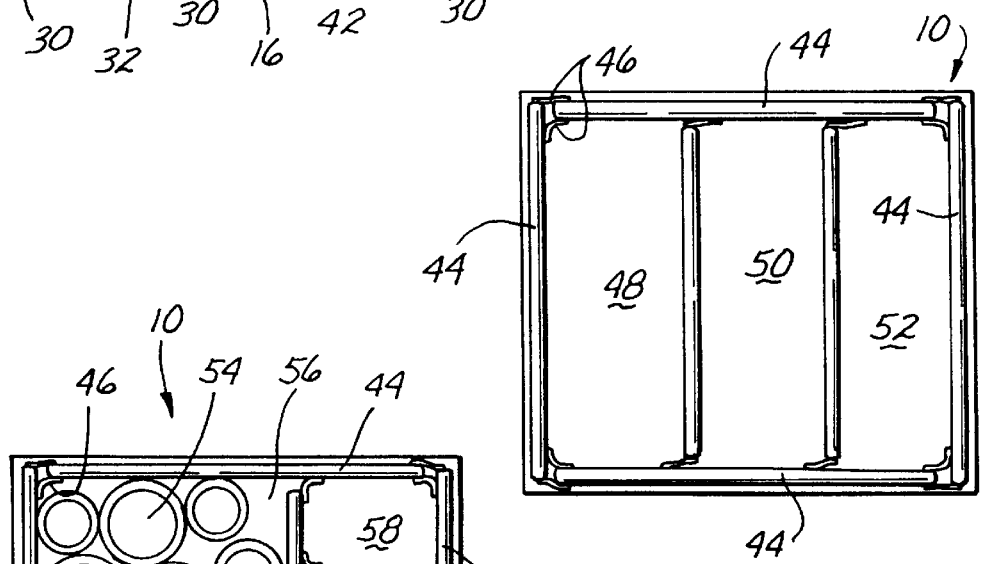
FIG. 4 is a top view of the interior of a flight bag like that of FIG. 1, illustrating one possible interior configuration for stowing hard items in the bag.
Figure 5:
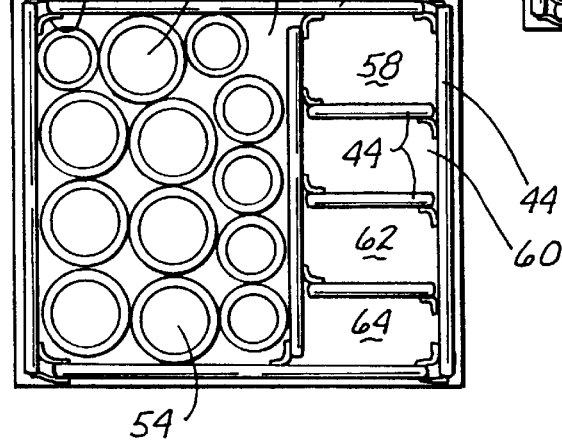
FIG. 5 is a top view similar to that of FIG. 4, illustrating an alternative interior configuration for stowing hard items in the bag.

Referring now to FIGS. 4 and 5, two alternative configurations for the interior of the flight bag 30 are illustrated. While the bag 30 is ideally suited for stowing soft goods, such as clothing and the like, many different items, including hard payload items such as tools, cameras, medical kits, and experiment samples, may also be stored in the bag. To ensure that they do not shift and become damaged while stowed, reusable generic foam pillows 44 may be provided, each of which are encased in a fabric that simulates the "pile" feature of VELCRO fasteners. Each pillow 44 includes VELCRO hook tabs 46 on each end thereof. In FIG. 4, the interior of the bag 10 has been configured for receiving rectangular payloads in thee compartments 48, 50, and 52, using six pillows 42 as illustrated. In FIG. 5, the interior of the bag 10 has been configured to receive both circular and rectangular payloads using 8 variously sized pillows 42 as illustrated. Circular payload items 54 are shown occupying a first compartment 56, with compartments 58, 60, 62, and 64 relining available to receive rectangular payload items.

As is apparent from the two illustrated examples in FIGS. 4 and 5, it is possible, using the VELCRO tabs 46 on the end of each pillow 42, to create multiple combinations of restraints and then readily reconfigure them as the payload changes.

While it is possible to use, transport, and stow the flight bags 10 individually or in rafted arrangements, as has been discussed and illustrated above, it will often be desirable, particularly in spacecraft applications, to store and/or transport a plurality of flight bags together in a larger structure. With reference now to FIGS. 7 and 8, two slightly modified embodiments of a first such structure or backpack 66 is illustrated. The illustrated backpack 66 is fabricated of the same or similar material as the flight bag 10 and is adapted to securely retain four flight bags 10 therein, oriented in the manner illustrated in FIG. 7. Alternatively, backpacks 66 have been fabricated by the inventors which are adapted to receive two flight bags, essentially identical in constructional detail to the four bag backpack, and in actuality backpacks may be constructed which are adapted to receive any desired number of flight bags.

As illustrated, the backpack 66 comprises a lid 68 which may be secured and opened, as desired, using a zipper 70. Four web straps 72, preferably 2 inches in width, extend widthwise across the lid 68. A lengthwise web strap 74 extends across the lid as well, orthogonally intersecting each of the widthwise straps 72. Angular web straps 76 are arranged along the length of the side panel 78 of the backpack 66, as illustrated, such that they intersect one or two lengthwise straps 80 (one strap 80 is shown in FIG. 8, while two are shown in FIG. 7—the two arrangements should be regarded as equivalent alternatives). A similar strap arrangement is disposed on the opposing side (not shown) of the backpack. Likewise, angular web straps 82 are also employed on the two opposed end panels of the backpack, of which only end panel 84 is shown (FIG. 8). These straps 82 also intersect one or two lengthwise straps 86 on each end panel, since the end panel strap arrangement is preferably substantially the same, as the side panel arrangement, except for specific differences to be discussed hereinafter.

The purpose of the angular web straps 76 and 82 on the side and end panels of the backpack 66 is to introduce an angular component in the X-Z plane to offset high loading forces during the spacecraft launch and landing operations. Each of the angular webs 76 on the side panels are releasably attached to the widthwise lid web straps 72 using a known buckle and ring fastener 88, alternative versions of which are illustrated in FIGS. 7 and 8. Similarly, the angular webs 82 on each end panel are releasably attached to the lengthwise lid strap 74 by means of a vertical strap 90 which is joined at one end to the webs 82 and lengthwise still 86 at their intersection point 92, and at the other end to the lid strap 74 through a releasable buckle and ring fastener 94 like those used to attach straps 72 to the straps 76. Thus, when the lid 70 of the backpack 66 is closed, the buckle and ring fasteners 88 and 94, which have integral locking features, may be secured to prevent accidental opening of the backpack. When it is desired to open the backpack to remove or emplace one or more flightbags 10, the number of buckle and ring fasteners 88, 94 necessary to unzip and open the lid a sufficient distance to provide access to the backpack interior may be released, as shown in FIG. 7.

For spacecraft applications, it may be desirable to employ a backpack adapter plate 96 to secure the backpack 66 to the support structure of the spacecraft (FIG. 8). The backpack adapter plate 96 is preferably comprised of a lightweight composite structural material, and in a preferred embodiment is approximately 21"×18"×44" and about 325 pounds. The backpack 66 is releasably attachable to the adapter plate 96 by means of quick release buckles 98 at the lower termini of the angular web straps 76 on each of the backpack side panels 78. The termini of each of the angular web straps 82 on the end panels 84 are also releasably attachable to the adapter plate through quick release buckles 100 (only one of which is shown). There are no vertical straps for attachment to the adapter plate 96 on the end panels themselves, so that multiple backpacks may be strapped to the spacecraft in an end-to-end fashion with no buckle interference and minimum space between bags. The adapter plate 96 may then be attached to the spacecraft floor (not shown) in less than an hour by technicians without special ground support equipment.

In order to minimize stress at the spacecraft/backpack interface, each buckle 98, 100 preferably includes a roller (not shown).

A useful feature of the inventive backpack 66 is the employment of a pair of transparent panels 102, preferably fabricated of a clear PTFE (TEFLON) material, extend lengthwise along the lid 68. These panels permit a quick inspection of the contents of the backpack without the necessity of opening it, and are particularly located to exhibit the pocket content identifiers 40 on each flight bag 10 when the bag is stowed in the backpack.

An alternative structure for stowing a plurality of flight bags 10 on board a flight vehicle, particularly a spacecraft, is illustrated in FIG. 9. In that figure, a preferred embodiment of a pressurized stowage rack 104 is shown, including a plurality of ports 106 for receiving flight bag liner bays 108. Initially, an X-strut assembly 110 is installed into each port 106 for receiving the liner bays 108. Each X-strut assembly 110 is preferably constructed of type 6061 aluminum and comprises a pair of diagonal frame members 112, a rear frame 114, and an X-strut 116. Pads 118 provide an interface for attaching the X-strut assembly 110 to the rack 104, using bolts or other conventional mechanical fastening techniques, as illustrated. Once the X-strut assembly is installed in the rack, the liner bay 108 may be installed on the X-strut assembly. The liner bay 108 is preferably fabricated of Kevlar, or similar fabric, and includes a plurality of straps 120, as well as a deflection pad and closeout 122. Beneath each of the straps 120 is an aluminum belt buckle (not shown) which is adapted to be attached, by conventional mechanical fastening techniques, to the diagonal frame member 112 on the liner bay's corresponding X-strut assembly. The deflection pad and closeout 122 is hinged to the liner bay body 124, as illustrated, and is preferably fabricated of an integrated fabric/foam insert having substantial foam padding (accounting for the bowed configuration) and enclosed by cross-over flaps of fabric having hook and loop closures to secure the two flaps against one another. A content identification card 126 is located on the outside surface of each deflection pad and closeout 122. Once the liner bay 108 has been installed in the rack, a flight bag 10 may be inserted into the liner bay, after which the deflection pad and closeout 122 is closed to secure the bag.

Advantages of the X-strut assembly design shown in FIG. 9 include the ability to carry loads from the fabric liner with 6 faces to four locations on the rack structure 104, thereby simplifying the design and providing clearly defined elastic load paths. Tension loads are gathered from the liner straps and buckles and transferred to the rack. Additionally, the X-strut assembly provides local stiffness to the rack structure, while being totally modular. Any number of soft stowage rack liners 108 may be installed in the rack 104 along with other equipment, if desired. Furthermore, the configuration supports late access installation. The open area at the front of the X-strut 116 permits a technician to easily reach the rear posts for installation. Unlike prior art rack arrangements, the entire assembly can be installed from the front of the rack 104 without removing the rear rack panels.

The deflection pad and closeout 122 is an advantageous design over conventional metal doors since the pad functions to introduce an "X" component into the load and thereby prevents "Y" accelerations of the flight bag from being normal to the flap close-out (this would tear the fabric or lead to failure of the rack corner posts). The pad allows the rack 104 to react loads in both the Y and X axes rather than just along the Y axis.

While this invention has been described with respect to various specific examples and embodiments, it is to be understood that the invention is not limited thereto and that it can be variously practiced within the scope of the following claims.

What is claimed is:

1. A bag for stowing items during travel, comprising:
   a fabric case having opposed side panels, opposed end panels, a lid and an interior compartment defined by the side panels and the end panels for receiving said items, the lid being selectively openable to permit access to the interior compartment;
   a retaining net comprised only of a single planar panel which is removably attachable to portions of the interior compartment and being adapted when attached to said portions to underlie said lid, such that when said lid is opened, the net panel is interposed between the items in the interior compartment and the exterior of the bag to assist retention of the items in the interior compartment, the retaining net having at least one access opening therein,
   a first closure means for selectively opening and closing said lid; and
   a second closure means for selectively opening and closing said at least one access opening.

2. The bag as recited in claim 1, wherein said lid includes an integral transparent panel adapted to permit visual inspection of the contents of the interior compartment without opening the lid.

3. The bag as recited in claim 1, and further comprising a plurality of hook and loop patches about its periphery, such that the bag may be releasably attached to other bags or may alternatively be collapsed upon itself when not in use, the collapsing action causing corresponding ones of said hook and loop patches to interengage to releasably retain the bag in the collapsed position.

4. The bag as recited in claim 1, wherein said closure means comprises a zipper.

5. The bag as recited in claim 1, and further comprising a plurality of partitions for dividing the interior compartment into a plurality of subcompartments for receiving items to be stowed in the bag, the partitions being adapted for arrangement into a plurality of configurations, to thereby create subcompartments variously sized to accommodate particular items.

6. The bag as recited in claim 5, wherein said partitions comprise pillows having fastening means attached thereto for facilitating attachment to interior walls of said bag.

7. A bag for stowing items during travel, comprising:
   a fabric case having opposed side panels, opposed end panels, a lid and an interior compartment defined by the side panels and the end panels for receiving said items, the lid being selectively openable to permit access to the interior compartment;
   a plurality of dual-function fasteners disposed on the side panels and end panels; the fasteners being disposed such that corresponding ones of said fasteners may be joined to attach two or more of said bags together, and the fasteners being further disposed such that corresponding ones of said fasteners on a single one of said panels may also be joined to collapse said panel upon itself to thereby collapse the bag for storage or transport;
   a retaining net which is removably attachable to portions of the interior compartment and which is adapted when attached to said portions to underlie said lid, such that when said lid is opened, the net panel is interposed between the items in the interior compartment and the exterior of the bag to assist retention of the items in the interior compartment, the retaining net having at least one access opening therein;
   a first closure means for selectively opening and closing said lid; and
   a second closure means for selectively opening and closing said at least one access opening.

8. The bag as recited in claim 7, and further comprising a plurality of partitions for dividing the interior compartment into a plurality of subcompartments for receiving items to be stowed in the bag, the partitions being adapted for arrangement into a plurality of configurations, to thereby create subcompartments variously sized to accommodate particular items.

9. The bag as recited in claim 8, wherein said partitions comprise pillows having fastening means attached thereto for facilitating attachment to interior walls of said bag.

10. The bag as recited in claim 7, and further comprising a plurality of straps adapted to overlie said lid to securely retain the lid in a closed position, the straps having quick release fasteners to secure the straps in place when the lid is closed and to quickly release one or more straps when it is desired to open the bag.

11. The bag as recited in claim 7, wherein the fasteners comprise hook and loop fasteners.

12. The bag as recited in claim 7, wherein said bag further comprises a strap and belt loops disposed at each corner of the bag for providing anchor points for said strap, said strap being adapted for attachment between either adjacent or diagonally opposed belt loops.

13. The bag as recited in claim 7, and further comprising a plurality of additional fabric cases disposed in said bag, said additional fabric cases each having opposed side panels, opposed end panels, a lid and an interior compartment defined by the side panels and the end panels, the lid of each additional fabric case being selectively openable to permit access to the interior compartment of that fabric case.

14. The bag as recited in claim 7, and further comprising an adapter plate attached to said fabric case, said adapter plate being adapted for attachment to a support structure.

* * * * *